(12) United States Patent
Reytier et al.

(10) Patent No.: US 10,145,018 B2
(45) Date of Patent: Dec. 4, 2018

(54) METHOD FOR OPERATING AN SOEC-TYPE STACK REACTOR FOR PRODUCING METHANE IN THE ABSENCE OF AVAILABLE ELECTRICITY

(71) Applicant: COMMISSARIAT A L'ENERGIE ATOMIQUE ET AUX ENERGIES ALTERNATIVES, Paris (FR)

(72) Inventors: Magali Reytier, Villard de Lans (FR); Marie Petitjean, Grenoble (FR); Guilhem Roux, Saint-Egreve (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 370 days.

(21) Appl. No.: 15/101,584

(22) PCT Filed: Nov. 19, 2014

(86) PCT No.: PCT/IB2014/066171
§ 371 (c)(1),
(2) Date: Jun. 3, 2016

(87) PCT Pub. No.: WO2015/083024
PCT Pub. Date: Jun. 11, 2015

(65) Prior Publication Data
US 2016/0355932 A1 Dec. 8, 2016

(30) Foreign Application Priority Data
Dec. 3, 2013 (FR) ...................................... 13 62024

(51) Int. Cl.
*C25B 15/02* (2006.01)
*C25B 15/08* (2006.01)
(Continued)

(52) U.S. Cl.
CPC .................. *C25B 3/00* (2013.01); *C25B 1/00* (2013.01); *C25B 1/06* (2013.01); *C25B 1/08* (2013.01);
(Continued)

(58) Field of Classification Search
None
See application file for complete search history.

(56) References Cited

U.S. PATENT DOCUMENTS 9,963,791 B2 * 5/2018 Reytier ................... C25B 15/08
10,023,506 B2 * 7/2018 Schulz .................... C25B 15/02
(Continued)

FOREIGN PATENT DOCUMENTS

DE 102012204985 A1 10/2013

OTHER PUBLICATIONS

Dayong, Tian et al., "Bimetallic Ni—Fe total-methanation catalyst for the production of substitute natural gas under high pressure.", Elsevier.com, Fuel 104, pp. 224-229 (2013).
(Continued)

*Primary Examiner* — Nicholas A Smith
(74) *Attorney, Agent, or Firm* — Oliff PLC

(57) ABSTRACT

A method for the operation of an SOEC stack reactor (《 Solid Oxide Electrolyser Cell 》), according to which, in the absence of electricity, synthesis gas $H_2+CO$ or a mixture $H_2+CO_2$ is injected at the cathode inlet of the reactor in such a way as to produce methane inside the reactor. Since the catalytic methanation reaction is exothermic, the stack reactor can therefore be held at temperature, without loss of fuel. The fuel used for the methanation (synthesis gas or hydrogen) can advantageously be that which has been previously produced during the operating phases with available electricity.

16 Claims, 4 Drawing Sheets

Figure 5A:
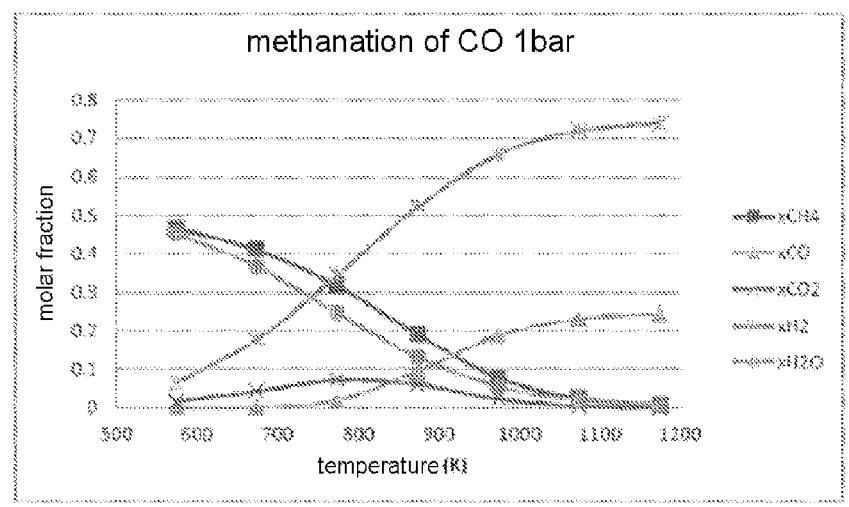

(51) Int. Cl.
    *C25B 1/06*     (2006.01)
    *C25B 3/00*     (2006.01)
    *C25B 1/00*     (2006.01)
    *C25B 1/08*     (2006.01)
    *C25B 9/06*     (2006.01)
    *C25B 11/04*     (2006.01)

(52) U.S. Cl.
    CPC ............ *C25B 9/06* (2013.01); *C25B 11/0405* (2013.01); *C25B 11/0415* (2013.01); *C25B 11/0447* (2013.01); *C25B 15/02* (2013.01); *C25B 15/08* (2013.01); *Y02E 60/366* (2013.01)

(56) References Cited

U.S. PATENT DOCUMENTS

2009/0289227 A1    11/2009    Rising
2012/0282534 A1    11/2012    Braun et al.

OTHER PUBLICATIONS

Oliveira, Eduardo L.G. et al., "Effect of catalyst activity in SMR-SERP for hydrogen production: Commercial vs. large-pore catalyst.", Elsevier.com. Chemical Engineering Science 66, pp. 342-354 (2011).

Ocampo, Fabien et al., "Methanation of carbon dioxide over nickel-based CE0.72ZR0.28O2 mixed oxide catalysts pepared by sol-gel method.", Elsevier.com, Applied Catalysts A: General 369, pp. 90-96, (2009).

Mar. 18, 2015 International Search Report issued in Patent Application No. PCT/IB2014/066171.

* cited by examiner

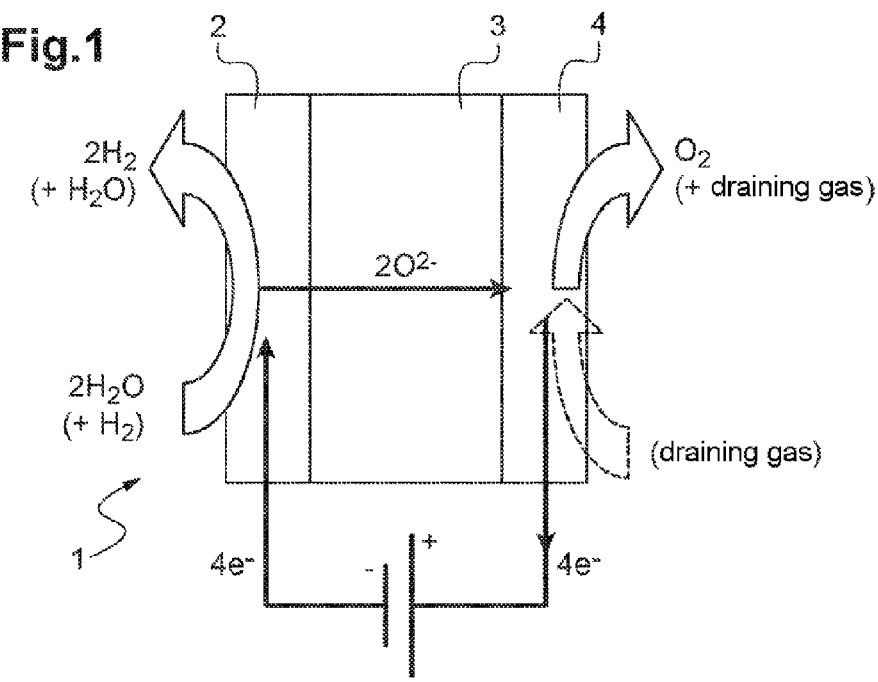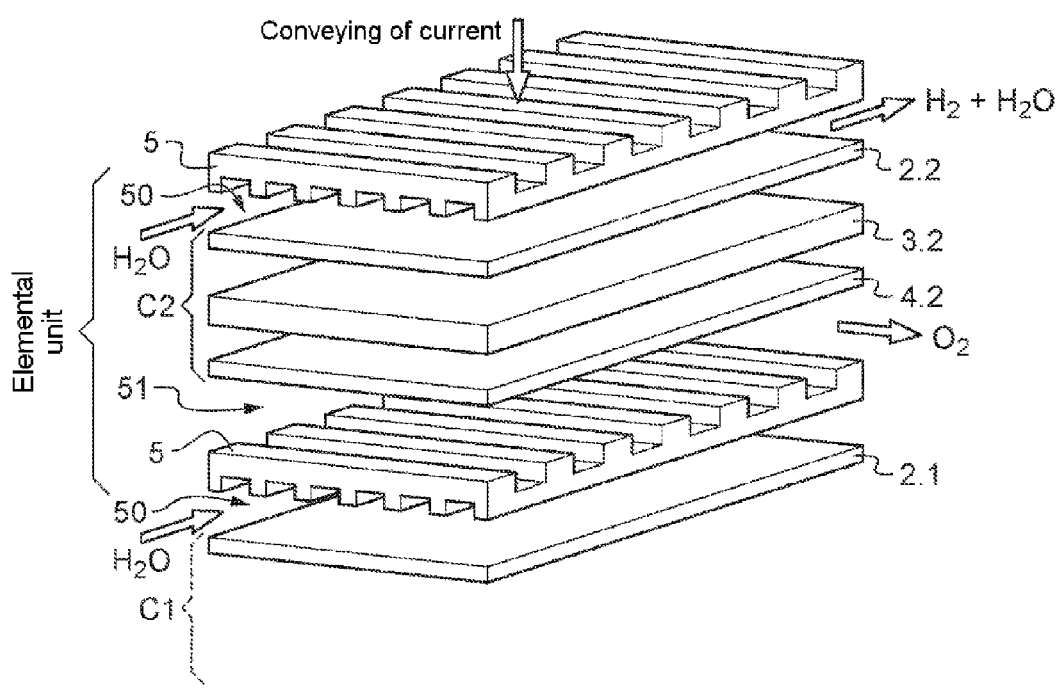

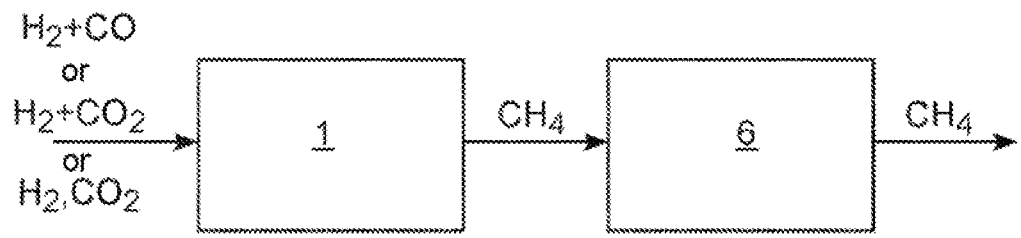
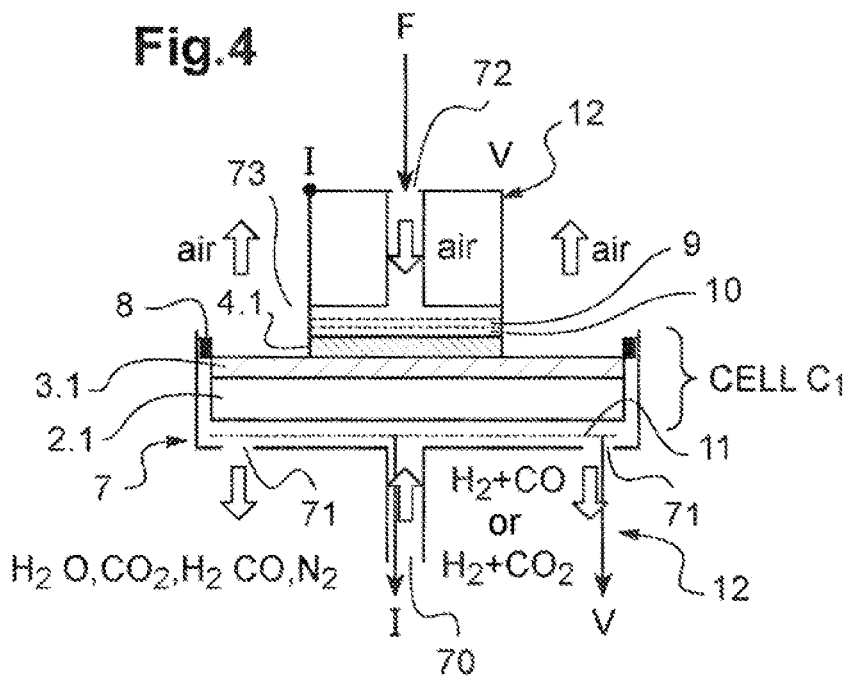

METHOD FOR OPERATING AN SOEC-TYPE STACK REACTOR FOR PRODUCING METHANE IN THE ABSENCE OF AVAILABLE ELECTRICITY

TECHNICAL FIELD

The present invention relates to the production of methane by heterogeneous catalysis.

The production process according to the invention comprises, beforehand, a step of high-temperature water electrolysis (HTE for "High Temperature Electrolysis" or HTSE for "High Temperature Steam Electrolysis") or a step known as high-temperature co-electrolysis of water and carbon dioxide $CO_2$, within an electrolysis cell stack reactor of SOEC type (acronym for "Solid Oxide Electrolyzer Cell") which is supplied with electricity.

The invention relates more particularly to the production of methane using this same reactor in the absence of available electricity.

PRIOR ART

Among the bulk energy storage solutions already envisioned, hydraulic storage is already very widespread. The remaining capacities for this type of storage risk being rapidly saturated. In addition, hydraulic systems require particular geographic and geological conditions and may as a result prove to be quite expensive. For the future storage problems, hydraulic storage may therefore be only a partial solution.

An alternative storage solution has also been envisioned: this is compressed air storage (CAES, the abbreviation for "Compressed Air Energy Storage"). According to this technology, it is envisioned to store compressed air produced with electricity in underground cavities. These cavities also require specific geological characteristics, such as saline cavities. However, the yield of this storage solution is unsatisfactory.

Finally, hydrogen is announced as an energy vector that is liable to be capable of bulk storage of electricity in certain configurations, mention may be made here of the product already carried out in *Corsica* under the acronym MYRTE (acronym for Mission hYdrogène Renouvelable pour l'Intégration au Réseau Electrique [mission relating to renewable hydrogen for integration in the electrical network]) at the applicant's initiative.

However, all these bulk energy storage solutions require the development of extensive infrastructures (sites suitable for hydraulics, underground cavities, hydrogen storage systems). This is why, more recently, bulk energy storage by conversion of renewable electricity into chemical energy via the production of synthetic fuel has made significant inroads, representing a storage alternative of great potential. Mention may be made here of patent application US 2009/0289227 which mentions technical conversion solutions.

Moreover, reducing the emissions of carbon dioxide $CO_2$ resulting from the use of fossil energies, upgrading as much as possible the $CO_2$ derived from the use of these energies rather than storing it for an indefinite period, using on demand electricity derived from "decarbonized" energy sources, in particular during periods of overproduction, converting this electricity into a storable product that may make it possible to produce electricity on demand during periods of production deficit without having to resort to the use of high-carbon energies are all objectives to be achieved for the sake of global efficiency.

The manufacture of a combustible syngas from a mixture of steam and carbon dioxide $CO_2$, by means of "decarbonized" electricity, satisfies these objectives.

The electrolysis of steam $H_2O$ to produce hydrogen H2 and/or the co-electrolysis of $H_2O+CO_2$ at high temperature within a solid oxide electrolyzer is one of the possibilities. The reactions for steam electrolysis (I) and for co-electrolysis of $H_2O+CO_2$ (II) take place according to the following equations:

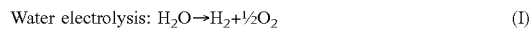

Water electrolysis: $H_2O \rightarrow H_2 + \frac{1}{2}O_2$ (I)

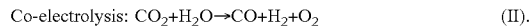

Co-electrolysis: $CO_2 + H_2O \rightarrow CO + H_2 + O_2$ (II).

Thus, the electrolysis of steam $H_2O$ allows a "direct" manufacture of combustible gas by heterogeneous catalysis by injection of a mixture of hydrogen $H_2$ produced according to the electrolysis (I) and of carbon dioxide $CO_2$ onto a catalyst.

The co-electrolysis of $H_2O+CO_2$ allows an "indirect" manufacture of combustible gas from the syngas $(H_2+CO)$ produced according to the co-electrolysis (II).

The combustible gas thus manufactured may be a hydrocarbon and in particular methane, the main component of natural gas.

The production of synthetic natural gas gives the possibility of immediately using all the existing infrastructures developed for this energy: transportation and distribution networks, storage capacities, electricity production systems, etc. In addition, it also emerges that the carbon balance for this production may be zero, or even negative, since the electricity used would be of decarbonized origin and the $CO_2$ would be derived from systems using fossil energies that would have been taken up beforehand.

To carry out the water electrolysis (I), it is advantageous to carry it out at a high temperature typically between 600 and 950° C., since part of the energy required for the reaction may be provided by heat, which is less expensive than electricity, and the activation of the reaction is more efficient at high temperature and does not require a catalyst. To carry out high-temperature electrolysis, it is known practice to use an electrolyzer of SOEC type (acronym for "Solid Oxide Electrolyzer Cell"), consisting of a stack of elementary units each comprising a solid oxide electrolysis cell, consisting of three anode/electrolyte/cathode layers superposed on one another, and of interconnecting plates made of metal alloys also known as bipolar plates, or interconnectors. The function of the interconnectors is to ensure both the passage of the electric current and the circulation of gases in the region of each cell (steam injected, hydrogen and oxygen extracted in an HTE electrolyzer; air and hydrogen injected and water extracted in an SOFC cell) and to separate the anode and cathode compartments which are the compartments for gas circulation on the anode side and the cathode side, respectively, of the cells. To carry out high-temperature steam electrolysis (HTE), steam $H_2O$ is injected into the cathode compartment. Under the effect of the current applied to the cell, the dissociation of the water molecules in vapor form takes place at the interface between the hydrogen electrode (cathode) and the electrolyte: this dissociation produces dihydrogen gas $H_2$ and oxygen ions. The dihydrogen is collected and removed at the hydrogen compartment outlet. The oxygen ions $O^{2-}$ migrate across the electrolyte and recombine as dioxygen at the interface between the electrolyte and the oxygen electrode (anode).

The co-electrolysis of steam and $CO_2$ (II) potentially offers the same energy and economic advantages as those described above for the steam electrolysis (reaction (I)). Its advantage lies in the possibility of carrying out the co-electrolysis reaction (II) in the same reactor while maintaining said reactor in a temperature range in the region of 800° C. Indeed, at this temperature, the voltages required for the reduction of $CO_2$ to $CO$ and of $H_2O$ to $H_2$ are virtually identical. By way of example, the abandon voltages, i.e. the electrical voltages obtained without electric current but solely by means of the different gases on either side of a cell, for a mixture of 90% oxidized species and 10% reduced species at 800° C. are, respectively, equal to 0.852 V for the $H_2O$, $H_2/O_2$ couples and 0.844 V for the $CO_2$, $CO/O_2$ couples.

Furthermore, high-temperature co-electrolysis has the same energy advantage as steam electrolysis between 750 and 900° C. relative to low-temperature water electrolysis. Indeed, the energy required for the dissociation of $H_2O$ molecules is reduced by the vaporization energy. Moreover, the kinetics of the reactions for electrolysis of $H_2O$ and of $CO_2$ are highly thermally activated and follow an Arrhenius law with activation energies of the order of 120 kj/mol.

Consequently, the efficiency of the reactions improves greatly when the temperature is increased. The higher electrochemical activity at high temperature also makes it possible to dispense with expensive catalysts, such as platinum required at lower temperatures. In addition, the production of syngas in the cathode compartment of the co-electrolysis reactor is accompanied by a production of oxygen in the anode compartment which may be upgraded thereafter, for example for the oxycombustion of natural gas.

That being said, while the high-temperature co-electrolysis (II) as envisioned offers the abovementioned advantages, namely the investment of a single electrolysis reactor, and thermal coupling between the various reactions, it has the drawback of not making it possible to obtain a variable $H_2/CO$ ratio in the mixed gas at the reactor outlet. In other words, when co-electrolysis is carried out, a desired outlet $H_2/CO$ ratio imposes a given inlet $H_2O/CO_2$ ratio. Indeed, operation close to the thermo-neutral operating point sets the voltage to be applied to the electrolyzer. Thus, for a desired outlet $H_2/CO$ ratio with a degree of water conversion close to 100%, the inlet $CO_2$ and $H_2O$ flow rates and compositions must necessarily be determined.

As it happens, each syngas intended to produce a combustible gas requires a given $H_2/CO$ ratio as a function of the targeted fuel. Likewise, the direct manufacture of the combustible gas requires a given $CO_2/H_2$ ratio as a function of the targeted fuel.

Table 1 below thus illustrates the ratios required as a function of processes for synthesizing various fuels:

TABLE 1

| SYNTHESIS PROCESS | COMBUSTIBLE PRODUCT OBTAINED | $H_2/CO$ RATIO REQUIRED | $CO_2/H_2$ RATIO REQUIRED |
|---|---|---|---|
| synthesis of methane | Natural gas | 1/3 | 1/4 |
| synthesis of methanol | Methanol | 1/2 | 1/3 |
| synthesis of dimethyl ether (DME) | DME | 1/1 | 1/2 |
| Ficher-Tropsch synthesis | Diesel | 1/2 | 1/3 |

The applicant proposed, in the patent application filed on Dec. 17, 2012, under number FR 12 62174, a novel co-electrolysis process and reactor for obtaining at the outlet a variable $H_2/CO$ ratio and therefore a syngas of which the composition is suitable for producing the desired combustible gas.

Moreover, the operating point retained for an electrolysis or co-electrolysis reactor also sets the thermal conditions in the electrolysis reactor. Indeed, for electrolyses carried out at high temperature, the energy $\Delta H$ required for dissociation of the inlet molecule ($H_2O$ or $CO_2$) may be provided in electrical and/or heat form. The thermal energy provided Q is then defined as a function of the voltage U at the terminals of each electrolysis cell by the relationship:

$$Q = \frac{I}{2F}\Delta H - U \cdot I,$$

in which U is the electrical voltage, I is the electric current and F is the Faraday constant. Thus, three operating regimes are defined, corresponding to three different thermal modes for the stack of electrolysis cells:

- the "autothermal" mode in which the imposed voltage Uimp is equal to $\Delta H/2F$. The heat consumed by the dissociation reaction is completely compensated for by the various electrical resistances of the electrolyzer (irreversibilities). The electrolysis reactor (electrolyzer) does not require any particular thermal management, while at the same time remaining temperature-stable;
- the "endothermic" mode in which the imposed voltage Uimp is less than $\Delta H/2F$. The electrolyzer consumes more heat than the electrical losses therein. This required heat must thus be supplied thereto by another means, otherwise its temperature will irremediably drop;
- the "exothermic" mode in which the imposed voltage Uimp is greater than $\Delta H/2F$. The electrolysis then consumes less heat than the electrical losses via the Joule effect. This evolution of heat within the electrolyzer must then be evacuated by another means, otherwise its temperature will prohibitively increase.

The endothermic mode requires less consumption of electricity: there is thus little production and heat needs to be supplied to the electrolysis reactor. The advantage of this endothermic mode lies in the availability of an inexpensive source of heat. Everything then depends on the nature and on the temperature of this heat source.

In contrast, the exothermic mode requires a larger consumption of electricity: there is thus substantial production, but the electrolysis reactor must be cooled, which may be very expensive. The advantage of this exothermic mode then depends greatly on the cost of the electricity and the use of the excess heat.

Thus, the thermal management of an electrolysis or co-electrolysis reactor is an important factor to be taken into consideration.

In addition, the transportation, storage and use of hydrogen require its pressurization. It is already known practice, instead of compressing the hydrogen produced, which entails a considerable cost, to carry out the water electrolysis directly using steam under pressure, the water then being compressed into the liquid state beforehand, which is much less expensive.

Various processes for obtaining a combustible gas by heterogeneous catalysis either directly using a mixture of $H_2$ and carbon dioxide $CO_2$, or indirectly using a syngas ($H_2$+CO), have already been studied.

In particular, the hydrogenation of $CO_2$ to methane is an industrial process which has been studied at each energy shock, either to produce synthetic methane from pure $CO_2$ and pure $H_2$, or in coal gasification plants with more complicated gases and conditions (Fischer-Tropsch process).

For the methanation process, two routes are possible and have been more or less studied in the prior art.

The first route is the direct route, with a single reaction according to the following equation:

$$CO_2+4H_2 \rightarrow CH_4+2H_2O: \text{hydrogenation of } CO_2$$

The second route is the indirect route, with a two-step reaction according to the following equations:

$$CO_2+H_2 \rightarrow CO+H_2O: \text{Reverse water-gas reaction (RWGS),}$$

$$CO+3H_2 \rightarrow CH_4+H_2O: \text{hydrogenation of CO.}$$

As demonstrated by the authors of the publication [1] (see in particular FIGS. 3 and 4), methanation reactions are favored at high pressure and at low temperature according to the Le Chatelier law. Indeed, the thermodynamic calculations indicated in [1] indicate a theoretical conversion of 100% of $CO_2$ into $CH_4$ at less than 150° C., compared with 83% at 400° C. However, it is also indicated that an optimum gas rate and temperature are to be adjusted in order to achieve the thermodynamic equilibrium that is the most advantageous in terms of degree of conversion of $CO_2$.

The catalysts used for methanation are generally based on nickel (Ni) supported on a zirconium oxide ($ZrO_2$), or based on Ni supported on an aluminum oxide ($Al_2O_3$). Publication [1] highlighted the high catalytic activity for a catalyst based on nickel (Ni) supported on mixed cerium (Ce) and zirconium oxides of formula $Ce_{0.72}Zr_{0.28}O_2$. Likewise, publication [2] showed, for a methanation at a pressure of 30 bar, the excellent catalytic activity of a bimetallic catalyst based on nickel (Ni) and iron (Fe) supported on an aluminum oxide ($Al_2O_3$), of formula Ni—Fe/γ-$Al_2O_3$.

The production of hydrogen or of syngas by HTE electrolysis or high-temperature co-electrolysis requires, by definition, electricity available in sufficient amount.

However, when "decarbonized" energy sources are by nature intermittent (wind power, solar power), situations may occur in which it is no longer possible, with such sources, to supply an HTE electrolysis reactor or high-temperature co-electrolysis reactor with electricity, or at the very least in sufficient amount for the implementation to be effective.

That being said, once such an HTE electrolysis or co-electrolysis reactor has been turned on, it is necessary to ensure that the temperature thereof is maintained, this being despite the possible intermittence of the electricity production, so as, on the one hand, to prevent thermal cycling that may damage it and, on the other hand, to offer possibilities for rapidly turning it on once electricity is again available.

A solution which has already been envisioned for solving this problem of maintaining the temperature of the reactor in the absence of available electricity, is to reverse its operation, i.e. to make it operate as an SOFC fuel cell (acronym for "Solid Oxide Fuel Cell") so as to produce current from hydrogen $H_2$ or from syngas (mixture of hydrogen $H_2$ and carbon monoxide CO), thereby making it possible to maintain the reactor temperature. This has the major drawback of producing electric current not on demand, but as soon as there is no longer any electricity available from the external sources. In addition, another major drawback is that fuel, i.e. $H_2$ or syngas, is thus consumed, i.e. burnt, solely for the purposes of maintaining the reactor temperature and without obtaining any other combustible product, but only electricity that may not be useful at that precise moment.

There is therefore a need to improve the process for operating an HTE electrolysis or co-electrolysis reactor in order to maintain it at temperature in the absence of available electricity, in particular without having to reverse it into an SOFC fuel cell and/or without having to burn $H_2$ or syngas fuel.

The aim of the invention is to at least partly satisfy this need.

SUMMARY OF THE INVENTION

To do this, in one of its aspects, the invention relates to a process for operating a reactor, termed first reactor, comprising a stack of elemental electrolysis cells of SOEC type, each formed from a cathode, an anode and an electrolyte inserted between the cathode and the anode, and a plurality of electrical and fluid interconnectors, each arranged between two adjacent elemental cells with one of its faces in electrical contact with the anode of one of the two elemental cells and the other of its faces in electrical contact with the cathode of the other of the two elemental cells, the cathodes being made of methanation reaction catalyst material(s).

According to the invention, the following steps are carried out:

a/ the first reactor is supplied with electricity, and either steam $H_2O$ or a mixture of steam and carbon dioxide $CO_2$ is supplied and distributed to each cathode, or steam is supplied and distributed to the cathode of one of the two adjacent elemental cells and carbon dioxide is supplied and distributed to the cathode of the other of the two elemental cells, so as to carry out, at each cathode, either a high-temperature electrolysis of the steam $H_2O$, or a high-temperature co-electrolysis of steam and carbon dioxide, b/ after step a/ and when the first reactor is supplied with a level of electric current that is insufficient to carry out an HTE electrolysis or a co-electrolysis of $H_2O$ and $CO_2$ within the first reactor, either a mixture of hydrogen $H_2$ and carbon monoxide CO, or a mixture of hydrogen $H_2$ and carbon dioxide $CO_2$, is supplied and distributed to each cathode, so as to carry out, at each cathode, a methanation by heterogeneous catalysis.

The term "absence of electricity supply" is intended to mean, here and in the context of the invention, a level of electric current that is insufficient to carry out an HTE electrolysis or a co-electrolysis of $H_2O$ and $CO_2$ within the SOEC stack reactor. This insufficient electric current may be close to zero or even zero.

The invention thus consists, with an insufficient level of electricity supply or even in the total absence of electricity, in injecting syngas $H_2$+CO or a mixture $H_2$+$CO_2$ at the inlet of cathodes of the stack reactor in such a way as to produce methane actually within the reactor. Since the catalytic methanation reaction is exothermic, the stack reactor may therefore be maintained at temperature, without loss of fuel, i.e. without said fuel being burnt. The fuel used for the methanation (syngas or hydrogen) may advantageously be that previously produced during the operating phases with available electricity.

Thus, according to the invention, the operating of the reactor is in a way bimodal, i.e. as a (co-)electrolyzer or as a methanation reactor.

Indeed, when the electricity is available in sufficient amount for the reactor, the hydrogen $H_2$ or the syngas ($H_2$+CO) is produced respectively by electrolysis of steam $H_2O$ or by co-electrolysis of $H_2O$+$CO_2$.

In the absence of available electric current, syngas ($H_2$+CO) or hydrogen $H_2$ with $CO_2$ feeds the inlet of the cathodes of the stack in such a way as to manufacture methane ($CH_4$) in situ. The possible operating of the reactor according to the invention bimodally also makes it possible to envision using said reactor exclusively as a methanation reactor in the event of electrical failure of the stack.

Moreover, by virtue of the invention, the reversal of the operating of the reactor, i.e. of the operating as an electrolyzer or co-electrolyzer to an SOFC fuel cell, can be carried out as desired, on demand when there is a need for electricity, and not in an imposed manner for the sole purpose of ensuring thermal control of the reactor in the absence of electricity.

It is specified here that the electrical and fluid interconnection devices, also called interconnectors or else interconnecting plates, are devices which provide the connection in series from an electrical point of view of each electrolysis cell in the stack of HTE reactors and in parallel from a fluidic point of view, thus combining the production of each of the cells. The interconnectors thus perform the functions of supplying and collecting current and delimit gas circulation (distribution and/or collection) compartments.

The electrolysis cells are advantageously of cathode-supported type. The term "cathode-supported cell" is intended to mean, here and in the context of the invention, the definition already given in the field of high-temperature water electrolysis HTE and denoted under the acronym CSC for "Cathode-supported Cell", i.e. a cell in which the electrolyte and the oxygen electrode (anode) are placed on the thicker hydrogen or carbon monoxide electrode (cathode) which then acts as a support.

For step a/, the co-electrolysis of steam and carbon dioxide may advantageously be carried out in the stack reactor according to the teaching of the abovementioned application FR 12 62174: the steam is fed and distributed to the cathode of one of the two adjacent elemental cells and carbon dioxide is fed and distributed to the cathode of the other of the two elemental cells. This makes it possible to vary as desired the $H_2$/CO ratio obtained at the outlet before mixing thereof to constitute the syngas converted into combustible gas in the chamber, and to facilitate the thermal management of the stack of electrolysis cells regardless of the operating mode (endothermic or exothermic mode), this being reversible according to the cost of the current.

According to one advantageous embodiment, the hydrogen $H_2$ or the mixture of hydrogen $H_2$ and carbon monoxide CO supplying the cathodes during step b/ is produced beforehand during step a/.

Preferably, step a/ is carried out at temperatures of between 600° C. and 1000° C.

Also preferably, step a/ is carried out at pressures of between 0 and 100 bar, preferably of between 4 and 80 bar.

According to one advantageous variant, step b/ is carried out at pressures of between 0 and 100 bar, preferably of between 4 and 80 bar.

The cathodes are preferably based on nickel (Ni) supported on zirconia ($ZrO_2$), preferably stabilized with yttrium oxide ($Y_2O_3$), or based on Ni supported on ceria, such as gadolinium-doped ceria (Ni-CGO).

Advantageously, a draining gas, such as air, circulates at each anode, during step a/.

Also advantageously, a draining gas, such as air, circulates at each anode, during step b/. The flow rate of draining gas at each anode is preferably adjusted to the flow rate at the cathode so as to manage the heat and the pressure equilibration in each of the chambers.

A subject of the invention is also, according to another aspect, a process for producing methane implementing the operating process which has just been described, comprising the following step:

c/ methane produced at the outlet of the first reactor (SOEC) is supplied to a second reactor suitable for carrying out a methanation, when the degree of conversion of the methane at the outlet of the first reactor is below a threshold value, then methane produced at the outlet of the second reactor is supplied to a storage reservoir or a distribution network, or c'/ methane produced at the outlet of the first reactor is directly supplied to a storage reservoir or a distribution network. The supplying of methane to the second reactor is also carried out by adding the mixture of unconverted $H_2$+CO (or $CO_2$).

Finally, a subject of the invention is a process for producing methane $CH_4$, preferably according to the previous process, from an "intermittent" energy source, implementing the operating process described above, step b/ being carried out when said intermittent source is no longer capable of producing electricity in a sufficient amount to carry out step a/.

DETAILED DESCRIPTION

Figure 5B:
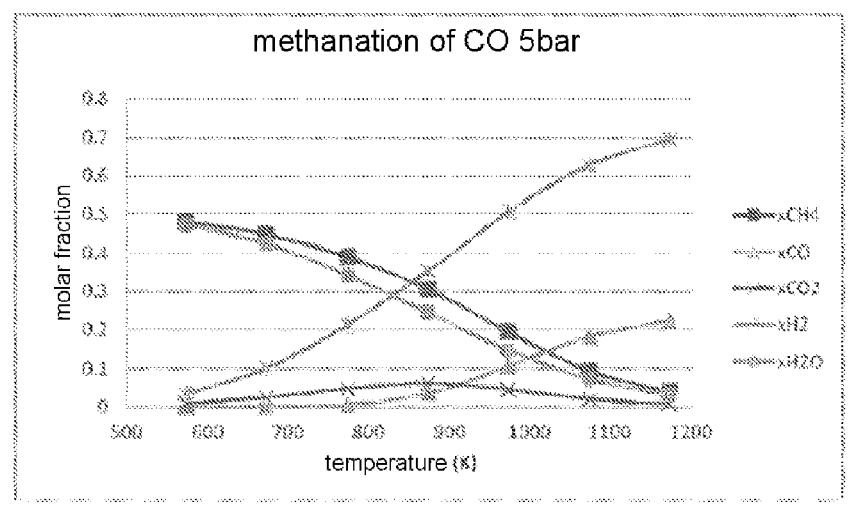
Figure 5C:
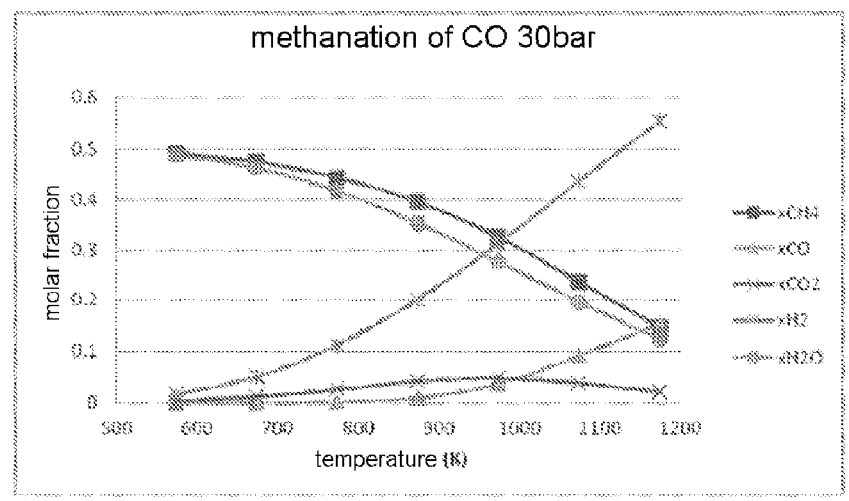
Figure 6A:
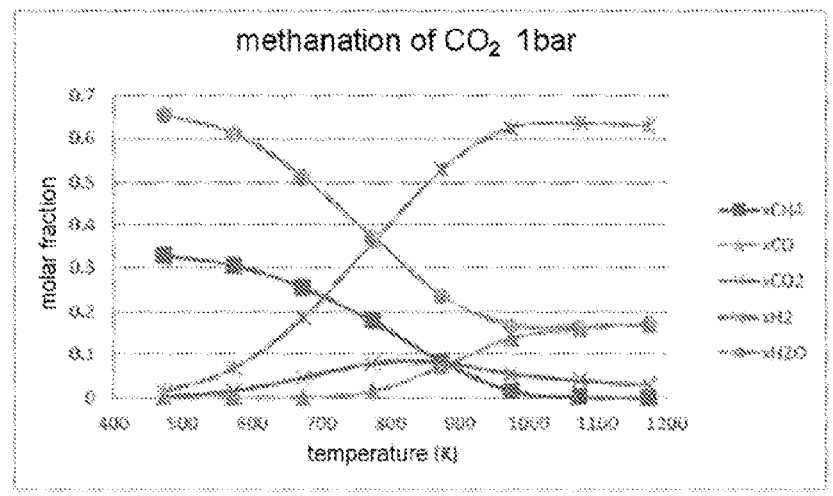
Figure 6B:
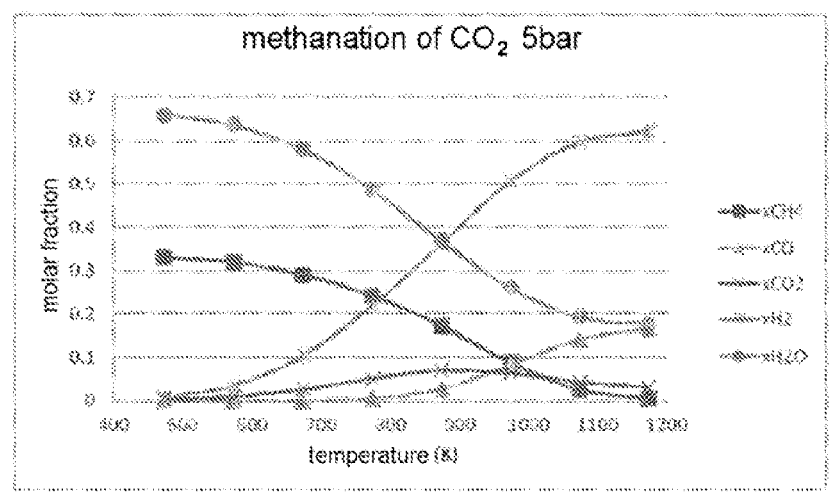
Figure 6C:
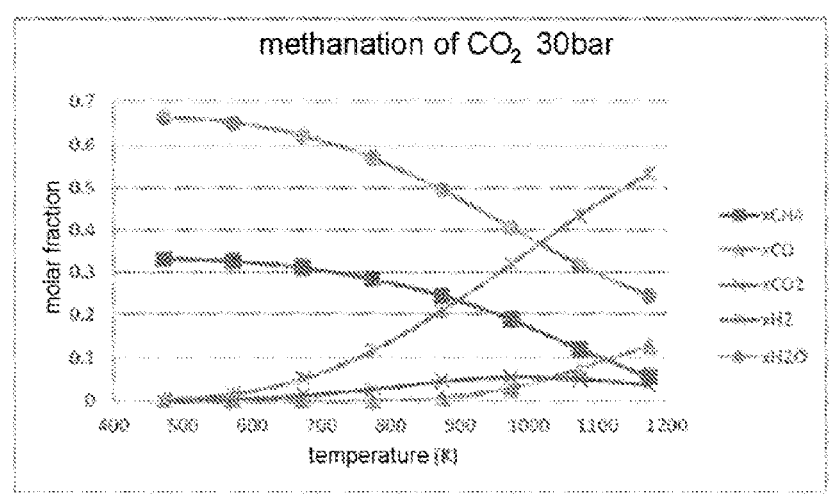

Other advantages and characteristics of the invention will emerge more clearly on reading the detailed description of exemplary embodiments of the invention given by way of nonlimiting illustration with reference to the following figures among which:

FIG. 1 is a diagrammatic view showing the operating principle of a high-temperature water electrolyzer, FIG. 2 is an exploded diagrammatic view of a part of a high-temperature steam electrolyzer comprising interconnectors, FIG. 3 is a diagrammatic view of a process for producing methane from methanation step b/ of the process of an SOEC reactor according to the invention, FIG. 4 is a diagrammatic view of an experimental SOEC reactor with a single electrochemical cell making it possible to carry out methanation step b/ of the process according to the invention, FIGS. 5A to 5C illustrate the production of the various species during methanation step b/ of the process according to the invention, using syngas, and at respective pressures of 1 bar, 5 bar and 30 bar, FIGS. 6A to 6C illustrate the production of the various species during methanation step b/ of the process according to the invention, using a mixture of $H_2$ and $CO_2$, and at respective pressures of 1 bar, 5 bar and 30 bar.

Throughout the present application, the terms "vertical", "lower", "upper", "bottom", "top", "below" and "above" are to be understood with reference relative to an SOEC reactor as it is in the vertical operating configuration.

Likewise, throughout the present application, the terms "inlet", "outlet", "downstream" and "upstream" are to be understood with reference to the direction of circulation of the gases from their entry into the SOEC reactor until their exit therefrom.

It is specified that, in FIGS. 1 to 3, the symbols and the arrows for supply of steam H₂O, distribution and recovery of dihydrogen H₂ and of oxygen O₂, and the current, carbon dioxide CO₂, distribution and recovery of carbon monoxide CO and oxygen O₂ and the current, and the methane CH₄ are shown for the purposes of clarity and precision, to illustrate the operating of an SOEC reactor 1 according to the invention and of a distinct methanation reactor 6.

It is also specified that all the reactors operating according to steps a/ and b/ of the process according to the invention that are described are of solid oxide type (SOEC, acronym for "Solid Oxide Electrolyte Cell") operating at high temperature. Thus, all the constituents (anode/electrolyte/cathode) of an electrolysis cell are ceramics.

Such constituents may be those of an SOFC fuel cell. The high operating temperature of the reactor 1 during the electrolysis or the co-electrolysis is typically between 600° C. and 1000° C.

Typically, the characteristics of an SOEC elemental electrolysis cell suitable for the invention, of the cathode-supported cell (CSC) type, may be those indicated as follows in table 2 below.

TABLE 2

| Electrolysis cell | Unit | Value |
|---|---|---|
| Cathode 2 | | |
| Constituent material | | Ni-YSZ |
| Thickness | μm | 315 |
| Thermal conductivity | W m⁻¹ K⁻¹ | 13.1 |
| Electrical conductivity | Ω⁻¹ m⁻¹ | 10⁵ |
| Porosity | | 0.37 |
| Permeability | m² | 10⁻¹³ |
| Tortuosity | | 4 |
| Current density | A · m⁻² | 5300 |
| Anode 4 | | |
| Constituent material | | LSM |
| Thickness | μm | 20 |
| Thermal conductivity | W m⁻¹ K⁻¹ | 9.6 |
| Electrical conductivity | Ω⁻¹ m⁻¹ | 1 10⁴ |
| Porosity | | 0.37 |
| Permeability | m² | 10⁻¹³ |
| Tortuosity | | 4 |
| Current density | A · m⁻² | 2000 |
| Electrolyte 3 | | |
| Constituent material | | YSZ |
| Thickness | μm | 5 |
| Resistivity | Ω m | 0.42 |

A water electrolyzer is an electrochemical device for producing hydrogen (and oxygen) under the effect of an electric current.

In HTE high-temperature electrolyzers, the electrolysis of water at high temperature is carried out using steam. The function of an HTE high-temperature electrolyzer is to convert the steam into hydrogen and oxygen according to the following reaction:

$$2H_2O \rightarrow 2H_2 + O_2.$$

This reaction is carried out electrochemically in the cells of the electrolyzer. As represented diagrammatically in FIG. 1, each elemental electrolysis cell 1 is formed from a cathode 2 and an anode 4, placed on either side of a solid electrolyte 3. The two electrodes (cathode and anode) 2, 4 are electron conductors, made of porous material, and electrolyte 3 is gas-tight, an electron insulator and an ion conductor. The electrolyte may in particular be an anionic conductor, more specifically an anionic conductor of O²⁻ ions and the electrolyzer is then referred to as an anionic electrolyzer.

The electrochemical reactions take place at the interface between each of the electron conductors and the ion conductor.

At cathode 2, the half-reaction is as follows:

$$2H_2O + 4e^- \rightarrow 2H_2 + 2O^{2-}.$$

At anode 4, the half-reaction is the following:

$$2O^{2-} \rightarrow O_2 + 4e^-.$$

Electrolyte 3 inserted between the two electrodes 2, 4 is the site of migration of the O²⁻ ions under the effect of the electrical field created by the potential difference imposed between anode 4 and cathode 2.

As illustrated in parentheses in FIG. 1, the steam at the cathode inlet may be accompanied by hydrogen H₂ and the hydrogen produced and recovered at the outlet may be accompanied by steam. Likewise, as illustrated with dashed lines, a draining gas, such as air, may also be injected at the inlet in order to remove the oxygen produced. The injection of a draining gas has the additional function of acting as a heat regulator.

An elemental electrolysis reactor consists of an elemental cell as described above, with a cathode 2, an electrolyte 3, and an anode 4, and of two monopolar connectors which ensure the electrical, hydraulic and thermal distribution functions.

To increase the flow rates of hydrogen and oxygen produced, it is known practice to stack several elemental electrolysis cells on top of one another, separating them with interconnection devices, usually known as interconnectors or bipolar interconnecting plates. The assembly is positioned between two end interconnecting plates which support the electrical feeds and gas feeds of the electrolyzer (electrolysis reactor).

A high-temperature water electrolyzer (HTE) thus comprises at least one, generally a plurality of electrolysis cells stacked on top of each other, each elemental cell being formed from an electrolyte, a cathode and an anode, the electrolyte being inserted between the anode and the cathode.

The fluid and electrical interconnection devices that are in electrical contact with one or more electrodes generally perform the functions of conveying and collecting electric current and delimit one or more gas circulation compartments.

Thus, a "cathode" compartment has the function of distributing electric current and steam and also recovering hydrogen at the cathode in contact.

An "anode" compartment has the function of distributing electric current and recovering the oxygen produced at the anode in contact, optionally using a draining gas.

Satisfactory operating of an HTE electrolyzer requires:
good electrical insulation between two adjacent interconnectors in the stack, otherwise the elemental electrolysis cell inserted between the two interconnectors will be short-circuited,
good electrical contact and a sufficient contact surface between each cell and interconnector, so as to obtain the lowest ohmic resistance between cell and interconnectors,
good leaktightness between the two distinct compartments, i.e. cathodic, otherwise the gases produced will undergo recombination resulting in a lowering of yield and especially the appearance of hot spots that damage the electrolyzer, good distribution of the gases both at the inlet and on recovery of the gases produced, otherwise there will be a loss of yield, non-uniformity of pressure and temperature in the various elemental cells, or even prohibitive degradation of the cells.

FIG. 2 represents an exploded view of elemental units of a high-temperature steam electrolyzer according to the prior art. This HTE electrolyzer comprises a plurality of elemental electrolysis cells C1, C2, of solid oxide (SOEC) type stacked alternately with interconnectors 5. Each cell C1, C2, etc. consists of a cathode 2.1, 2.2, etc. and of an anode 4.1, 4.2, between which is placed an electrolyte 3.1, 3.2, etc.

The interconnector 5 is a component made of metal alloy which ensures separation between the cathode compartment 50 and the anode compartment 51, defined by the volumes between the interconnector 5 and the adjacent anode 4.2 and between the interconnector 5 and the adjacent cathode 2.1, respectively. It also ensures the distribution of the gases to the cells. The injection of steam into each elemental unit takes place in the cathode compartment 50. The collection of the hydrogen produced and of the residual steam at the cathode 2.1, 2.2, etc. is performed in the cathode compartment 50 downstream of the cell C1, C2, etc. after dissociation of the steam by the latter. The collection of the oxygen produced at the anode 4.2 is performed in the anode compartment 51 downstream of the cell C1, C2, etc. after dissociation of the steam by the latter.

The interconnector 5 ensures the passage of the current between the cells C1 and C2 by direct contact with the adjacent electrodes, i.e. between the anode 4.2 and the cathode 2.1.

In the high-temperature co-electrolyzers HTE, the high-temperature co-electrolysis is carried out using steam and carbon dioxide $CO_2$. The function of an SOEC high-temperature co-electrolyzer is to convert the steam and the $CO_2$ into hydrogen, carbon monoxide and oxygen according to the following reaction:

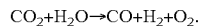
$$CO_2+H_2O \rightarrow CO+H_2+O_2.$$

A co-electrolyzer 1 may comprise exactly the same solid oxide constituents (SOEC) as an HTE electrolyzer which has just been described. Usually, the steam and the carbon dioxide $CO_2$ are mixed before entry into the co-electrolyzer and injected simultaneously into each cathode compartment 50.

Currently, when it is desired to carry out a methanation by heterogeneous catalysis, two routes are possible. The first route is the direct route, with a single reaction according to the following equation:

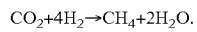
$$CO_2+4H_2 \rightarrow CH_4+2H_2O.$$

The second route is the indirect route, with a two-step reaction according to the following equations:

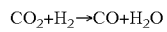
$$CO_2+H_2 \rightarrow CO+H_2O$$

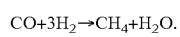
$$CO+3H_2 \rightarrow CH_4+H_2O.$$

The methanation is carried out in a reactor in which the solid catalyst of the reaction is present.

The hydrogen and, where appropriate, the carbon monoxide may be produced beforehand either by HTE electrolysis in an electrolysis reactor 1 described with reference to FIGS. 1 to 3, or by high-temperature co-electrolysis, also in a co-electrolysis reactor 1 described.

It is envisioned to carry out the HTE electrolysis or high-temperature co-electrolysis of the steam $H_2O$ and carbon dioxide $CO_2$ with "decarbonized" energies which are by nature intermittent (wind power, solar power).

However, with such energies, electricity production may be interrupted, or at the very least be reduced to a low level, over the course of more or less long periods which may be impromptu.

Under these conditions, the HTE electrolysis or the co-electrolysis may no longer be provided by the SOEC reactor 1 owing to the absence of electric current (voltage).

However, in the event of it being impossible to carry out the electrolysis or the co-electrolysis, it is necessary to be able to maintain the SOEC reactor 1 at temperature in order, on the one hand, to prevent thermal cycling that may damage it and, on the other hand, to make it possible to rapidly start up again as soon as the electric current is again available.

To solve this problem, the inventors of the present invention have thought to supply and distribute to each cathode 2.1, 2.2, etc. either a mixture of hydrogen $H_2$ and carbon monoxide CO, or a mixture of hydrogen $H_2$ and carbon dioxide $CO_2$, so as to carry out, at each cathode, a methanation by heterogeneous catalysis.

In other words, in the absence of available electricity, an additional function of methanation reactor is assigned to the SOEC reactor 1.

Likewise in other words, the operation of the SOEC reactor 1 is bimodal:

HTE electrolysis or co-electrolysis of $H_2O$ and $CO_2$ when the electricity is available in sufficient amount, methanation, in the event of absence of available current, or at the very least a level insufficient to carry out an HTE electrolysis or co-electrolysis reaction.

Judiciously, the inventors started from the observation that certain solid oxide cathode materials, in particular those based on nickel (Ni) supported on zirconia ($ZrO_2$), used in SOEC reactors, were also proven as methanation reaction solid catalysts.

The methanation operation of an SOEC reactor 1 makes it possible to envision methane production in the absence of electricity: thus, the methane $CH_4$ produced at the outlet of the reactor 1 supplies:

either a second reactor 6, capable of carrying out a methanation, with methane produced at the outlet of the first reactor when the degree of conversion of the latter is below a threshold value, then methane produced at the outlet of the second reactor is supplied to a storage reservoir or a distribution network, as illustrated in FIG. 3;

or directly a methane storage reservoir or distribution network.

The inventors of the present invention have produced a solid oxide single-cell C1 reactor 1 in order to experimentally prove the methanation within such a reactor.

The experimental reactor 1 is shown in FIG. 4. It comprises a cell C1 consisting of a cathode 2.1, an anode 4.1 and an electrolyte 3.1 inserted between the cathode 2.1 and the anode 4.1.

The cathode 2.1 concerned that is used is a cermet 50 mm in diameter and consists of a stack of two layers, namely:
- a support layer made of Ni-3YSZ ($ZrO_2$+3 mol % $Y_2O_3$), having a thickness of 500 µm,
- a functional layer made of Ni-8YSZ ($ZrO_2$+8 mol % $Y_2O_3$), having a thickness of between 5 and 10 µm.

The electrolyte 3.1 is made of 8YSZ ($ZrO_2$+8 mol % $Y_2O_3$), having a thickness of 5 µm.

The anode 4.1 is made of LSCo (strontium-doped lanthanum cobaltite), having a thickness of 20 µm.

The cell C1 is mounted in a housing-support 7 made of alumina ($Al_2O_3$). The mounting of the cell C1 is leaktight by means of a glass seal 8 at the periphery of the electrolyte 3.1. The mounting of the cell C1 is also under compression from a maximum load of 2 kg/cm² as illustrated by the arrow F in FIG. 4.

The housing 7 has, in its lower part, a central opening 70 for supplying gas (syngas or mixture of $H_2$ and $CO_2$) and also an opening 71 for recovering gas obtained by means of the reaction within the cathode 2.1.

It also has, in its upper part, a central opening 72 for supplying draining gas (air) at the anode 4.1 and an opening 73 for evacuating the draining gas.

Various contact grids 9, 10, 11 are arranged in contact, respectively, with the anode 4.1 and the cathode 2.1. More specifically, the grid 11 in contact with the cathode 2.1 is made of nickel, having a thickness equal to 0.45 mm, with 100 mesh cells/cm² and a unit wire diameter of 0.22 mm. The contact grids 9, 10 are for their part made of gold and platinum.

As illustrated in FIG. 4, the grids 9, 10, 11 allow an electrical supply of current I and/or voltage U to the cell C1 in order for it to carry out a reaction for HTE electrolysis or co-electrolysis of steam $H_2O$ and of $CO_2$.

Either a syngas ($H_2$+CO) or a mixture $H_2$+$CO_2$ is injected at the inlet 70 of cathode 2.1 and air is simultaneously injected at the inlet 72 of anode 4.1, without polarizing the cell.

The gas analysis was carried out, after condensation of the gases in order to remove $H_2O$, by micro gas chromatography by means of the apparatus sold by the company SRA under the name "MicroGC 3000".

Two series of measurements were carried out with two different types of cell C1 using the same materials but different manufacturers.

The measurement results and also calculations are reproduced hereinafter in tables 3 and 4, each for a type of cell. It is specified that the total value of the composition of the gases is slightly greater than 100% owing to measurement uncertainties.

TABLE 3

| Cell temperature (° C.) | Total inlet flow rate (NL/h) | Inlet gas composition (vol %) | | | | Measured composition of outlet gases (vol %) | | | | | | | Calculated composition of outlet gases with $H_2O$ (vol %) | | | | | | | |
|---|---|---|---|---|---|---|---|---|---|---|---|---|---|---|---|---|---|---|---|---|
| | | % H2 | % CO | % CO2 | % N2 | % H2 | % O2 | % N2 | % CH4 | % CO | % CO2 | Crude total | % H2 | % O2 | % N2 | % CH4 | % CO | % CO2 | % H2O | Crude total |
| 600 | 8.17 | 75 | 25 | — | — | 65.1 | 0.1 | 2.2 | 9.5 | 19.3 | 5.9 | 102.2 | 59.5 | 0.1 | 2.0 | 8.7 | 17.7 | 5.4 | 8.7 | 102.2 |
| 600 | 8.17 | 80 | — | 20 | — | 71.0 | 0.1 | 1.8 | 3.8 | 11.8 | 12.8 | 101.3 | 66.0 | 0.1 | 1.7 | 3.6 | 10.9 | 11.9 | 7.1 | 101.3 |

TABLE 4

| Air flow rate (NL/h) | Cell temperature (° C.) | | Total inlet flow rate (NL/h) | Inlet gas composition (vol %) | | | | Measured composition of outlet gases (vol %) | | | | |
|---|---|---|---|---|---|---|---|---|---|---|---|---|
| | T1 | T2 | | % H2 | % CO | % CO2 | % N2 | % H2 | % O2 | % N2 | % CH4 | % CO |
| 43.58 | 616.3 | 603.2 | 8.17 | 75 | 25 | — | — | 62.1 | 0.0 | 3.8 | 13.2 | 15.4 |
| 30 | 616.7 | 604.3 | 8.17 | 75 | 25 | — | — | 62.8 | 0.0 | 3.0 | 32.9 | 15.7 |

| Air flow rate (NL/h) | Measured composition of outlet gases (vol %) | | Calculated composition of outlet gases with $H_2O$ (vol %) | | | | | | |
|---|---|---|---|---|---|---|---|---|---|
| | % CO2 | Crude total | % H2 | % O2 | % N2 | % CH4 | % CO | % CO2 | % H2O | Crude total |
| 43.58 | 6.1 | 100.7 | 54.9 | 0.0 | 3.4 | 11.7 | 13.6 | 5.4 | 11.7 | 100.7 |
| 30 | 6.3 | 100.6 | 55.7 | 0.0 | 2.7 | 11.4 | 13.9 | 5.6 | 11.4 | 100.6 |

From these tables 3 and 4, it may be concluded first of all that the cell C1 actually carried out a methanation reaction.

It may also be concluded therefrom that the cell C1 and therefore the reactor 1 undergoes significant heating during the methanation, which is all the greater the lower the air flow rate at the anode.

Consequently, it is advantageously possible to adjust the flow rate of draining gas (air) at the anodes of an SOEC reactor in order to control, by forced convection, the rise in temperature due to the methanation and to thus protect the SOEC cells against excessive heating.

The inventors of the present invention performed thermodynamic calculations as follows in order to corroborate the experimental feasibility of the methanation with the gases $CO_2$, CO, $H_2$ and $H_2O$.

They first considered the three reactions involved during the methanation of $CO_2$ (and CO), which are:

$$CO_2 + 4H_2 \leftrightarrow CH_4 + 2H_2O \text{ methanation of } CO_2 \quad (1),$$

$$CO + 3H_2 \leftrightarrow CH_4 + H_2O \text{ methanation of } CO \quad (2),$$

$$CO_2 + H_2 \leftrightarrow CO + H_2O \text{ RWGS (Reverse Water Gas Shift)} \quad (3).$$

The thermodynamic analysis, as done in publication [3], was carried out by resolving the system:

$$\begin{cases} \dfrac{P_{CH_4} P_{H_2O}^2}{P_{H_2}^4 P_{CO_2}} - K_{CO_2}^p = 0 \\ \dfrac{P_{H_4} P_{CO_2}}{P_{CO} P_{H_2O}} - K_{RWGS}^p = 0 \end{cases} \quad (4)$$

with the equilibrium constants which are written:

$$K_{CO_2}^p = \frac{P_{H2O}^2 P_{CH4}}{P_{H_2}^4 P_{CO_2}} = \left[7.24E^{10}\exp\left(\frac{-21646}{T}\right)\right]^{-1} \quad (5)$$

$$K_{CO}^p = \frac{P_{H2O} P_{CH4}}{P_{H_2}^3 P_{CO}} = \left[1.22E^{13}\exp\left(\frac{-26830}{T}\right)\right]^{-1} \quad (6)$$

$$K_{RWGS}^p = \frac{P_{H2O} P_{CO}}{P_{H_2} P_{CO_2}} = \left[1.26E^{-2}\exp\left(\frac{4639}{T}\right)\right]^{-1} \quad (7)$$

The temperature T is given in degrees Kelvin, and the unit of the equilibrium constants $K^p$ is given in $\text{bar}^{-1}$.

The expressions of the reaction kinetics are the following:

$$r_{CO_2} = \quad (8)$$
$$-\frac{k_{CO_2}}{P_{H_2}^{3.5}}\left(P_{CH_2}P_{H_2O}^2 - \frac{P_{H_2}^4 P_{CO_2}}{K_{CO_2}^p}\right) \cdot \frac{1}{\left(1 + K_{CO}^{ad}P_{CO} + K_{H_2}^{ad}P_{H_2} + K_{CH_4}^{ad}P_{CH_4} + \dfrac{K_{H_2O}^{ad}P_{H_2O}}{P_{H_2}}\right)}$$

$$r_{CO} = -\frac{k_{CO}}{P_{H_2}^{2.5}}\left(P_{CH_4}P_{H_2O} - \frac{P_{H_2}^3 P_{CO}}{K_{CO}^p}\right) \cdot \frac{1}{\left(1 + K_{CO}^{ad}P_{CO} + K_{H_2}^{ad}P_{H_2} + K_{CH_4}^{ad}P_{CH_4} + \dfrac{K_{H_2O}^{ad}P_{H_2O}}{P_{H_2}}\right)} \quad (9)$$

$$r_{RWGS} = \quad (10)$$
$$-\frac{k_{RWGS}}{P_{H_2}}\left(P_{CO}P_{H_2O} - \frac{P_{H_2}P_{CO_2}}{K_{RWGS}^p}\right) \cdot \frac{1}{\left(1 + K_{CO}^{ad}P_{CO} + K_{H_2}^{ad}P_{H_2} + K_{CH_4}^{ad}P_{CH_4} + \dfrac{K_{H_2O}^{ad}P_{H_2O}}{P_{H_2}}\right)}$$

with $\text{kmol.kg}_{cat}^{-1}.\text{h}^{-1}$ as unit. The symbols $P_i$ represent the partial pressures in bar.

The kinetic constants $k_i$ are given by the equations:

$$k_{CO_2} = 1.02E^{15}\exp\left(\frac{-243.9E^3}{RT}\right) \quad (11)$$

$$k_{CO} = 4.225E^{15}\exp\left(\frac{-240.9E^3}{RT}\right) \quad (12)$$

$$k_{RWGS} = 1.955E^6\exp\left(\frac{-67.13E^3}{RT}\right) \quad (13)$$

and are expressed in $\text{kmol.bar}^{-1}.\text{kg}_{cat}^{-1}.\text{h}^{-1}$.

It should be noted that these values were identified for reforming between 400 and 600° C. at 2 bar.

The adsorption constants $K_i^{ad}$ are for their part given by the equations:

$$K_{CO_2}^{ad} = 8.23E^{-5}\exp\left(\frac{-70.65E^3}{RT}\right) \quad (14)$$

$$K_{H_2}^{ad} = 6.12E^{-9}\exp\left(\frac{82.9E^3}{RT}\right) \quad (15)$$

$$K_{CH_4}^{ad} = 6.65E^{-4}\exp\left(\frac{38.28E^3}{RT}\right) \quad (16)$$

$$K_{H_2O}^{ad} = 1.77E^5\exp\left(\frac{-88.68E^3}{RT}\right) \quad (17)$$

with $\text{bar}^{-1}$ as unit.

The curves of the molar fractions of each species obtained, which were calculated as above for the methanation of CO at respective pressures of 1 bar, 5 bar and 30 bar, have been represented in FIGS. 5A to 5C.

The curves of the molar fractions of each species obtained, which were calculated as above for the methanation of $CO_2$ at respective pressures of 1 bar, 5 bar and 30 bar have been represented in FIGS. 6A to 6C.

It results from these curves that the pressure has a strong beneficial effect on the methanation starting from a temperature of 700K. For an identical degree of conversion, the pressure makes it possible to work at temperatures 250° C. higher compared with atmospheric pressure.

Finally, whatever the pressure, methanation of CO is preferable to that of $CO_2$.

The invention which has just been described, both by means of tests and by means of a thermodynamic analysis, makes it possible to envision methane production in situ within an SOEC reactor 1.

At 600° C. and at atmospheric pressure, methane production is greater starting from CO than starting from $CO_2$.

Under the experimental conditions that were retained, the production causes a significant increase in temperature of several degrees, thereby making it possible to envision maintaining an SOEC reactor at temperature.

Finally, a methanation within a reactor under pressure makes it possible to envision a higher degree of conversion to methane and also maintaining at a higher temperature.

The invention is not limited to the examples which have just been described; characteristics of the examples illustrated may in particular be combined with one another in variants which have not been illustrated.

REFERENCES CITED

[1]: Fabien Ocampo et al, "*Methanation of carbon dioxide over nickel-based Ce0.72Zr0.28O2 mixed oxide catalysts prepared by sol-gel method*", Journal of Applied Catalysis A: General 369 (2009) 90-96.

[2]: Dayan Tiang et al, "*Bimetallic Ni—Fe total-methanation catalyst for the production of substitute natural gas under high pressure*", Journal of Fuel 104 (2013) 224-229.

[3] Eduardo L. G. Oliveira, Carlos A. Grande, Alirio E. Rodrigues, "*Effect of catalyst activity in SMR-SERP for hydrogen production*": Commercial vs. large-pore catalyst Chemical Engineering Science 66 (2011) 342-354.

The invention claimed is:

1. A process for operating a reactor, termed first reactor, comprising a stack of elemental electrolysis cells of SOEC type, each formed from a cathode, an anode and an electrolyte inserted between the cathode and the anode, and a plurality of electrical and fluid interconnectors, each arranged between two adjacent elemental cells with one of its faces in electrical contact with the anode of one of the two elemental cells and the other of its faces in electrical contact with the cathode of the other of the two elemental cells, the cathodes being made of methanation reaction catalyst material(s), according to which process the following steps are carried out:

a/ the first reactor is supplied with electricity, and either steam $H_2O$ or a mixture of steam and carbon dioxide $CO_2$ is supplied and distributed to each cathode, or steam is supplied and distributed to the cathode of one of the two adjacent elemental cells and carbon dioxide is supplied and distributed to the cathode of the other of the two elemental cells, so as to carry out, at each cathode, either a high-temperature electrolysis of the steam $H_2O$, or a high-temperature co-electrolysis of steam and carbon dioxide, b/ after step a/ and when the first reactor is supplied with a level of electric current that is insufficient to carry out an HTE electrolysis or a co-electrolysis of $H_2O$ and $CO_2$ within the first reactor, either a mixture of hydrogen $H_2$ and carbon monoxide CO, or a mixture of hydrogen $H_2$ and carbon dioxide $CO_2$, is supplied and distributed to each cathode, so as to carry out, at each cathode, a methanation by heterogeneous catalysis.

2. The operating process as claimed in claim 1, wherein the hydrogen $H_2$ or the mixture of hydrogen $H_2$ and carbon monoxide CO supplying the cathodes during step b/ is produced beforehand during step a/.

3. The operating process as claimed in claim 1, step a/ being carried out at temperatures of between 600° C. and 1000° C.

4. The process as claimed in claim 1, step a/ being carried out at pressures of between 0 and 100 bar.

5. The process as claimed in claim 4, step a/ being carried out at pressures of between 4 and 80 bar.

6. The process as claimed in claim 1, step b/ being carried out at pressures of between 0 and 100 bar.

7. The process as claimed in claim 6, step b/ being carried out at pressures of between 4 and 80 bar.

8. The process as claimed in claim 1, the cathodes being based on nickel (Ni) supported on zirconia ($ZrO_2$) or ceria.

9. The process as claimed in claim 1, a draining gas circulating at each anode, during step a/.

10. The process as claimed in claim 1, a draining gas circulating at each anode, during step b/.

11. The process as claimed in claim 10, wherein the flow rate of draining gas at each anode is adjusted to the cathode flow rate for the heat management and the equilibration of the pressures between chambers.

12. A process for producing methane implementing the operating process as claimed in claim 1, comprising the following step:

c/ methane produced at the outlet of the first reactor is supplied to a second reactor suitable for carrying out a methanation, when the degree of conversion of the methane at the outlet of the first reactor is below a threshold value, then a storage reservoir or a distribution network is supplied with methane produced at the outlet of the second reactor, or c'/ methane produced at the outlet of the first reactor is directly supplied to a storage reservoir or a distribution network.

13. A process for producing methane $CH_4$ from an "intermittent" energy source, implementing the operating process as claimed in claim 1, step b/ being carried out when said intermittent source is no longer capable of producing electricity in a sufficient amount to carry out step a/.

14. The process as claimed in claim 9, wherein the draining gas is air.

15. The process as claimed in claim 10, wherein the draining gas is air.

16. The process as claimed in claim 13, further comprising the following step:

c/ methane produced at the outlet of the first reactor is supplied to a second reactor suitable for carrying out a methanation, when the degree of conversion of the methane at the outlet of the first reactor is below a threshold value, then a storage reservoir or a distribution network is supplied with methane produced at the outlet of the second reactor, or c'/ methane produced at the outlet of the first reactor is directly supplied to a storage reservoir or a distribution network.

* * * * *